(12) United States Patent
Ostermeier et al.

(10) Patent No.: US 8,332,851 B2
(45) Date of Patent: *Dec. 11, 2012

(54) CONFIGURATION AND EXECUTION OF MASS DATA RUN OBJECTS

(75) Inventors: Jan Ostermeier, Wiesloch (DE); Martin J. Wilmes, Offersheim (DE); Heiko Gerwens, Heidelberg (DE); Wolfram Puechert, Speyer (DE)

(73) Assignee: SAP AG, Walldorf (DE)

( * ) Notice: Subject to any disclaimer, the term of this patent is extended or adjusted under 35 U.S.C. 154(b) by 1469 days.

This patent is subject to a terminal disclaimer.

(21) Appl. No.: 11/647,910

(22) Filed: Dec. 28, 2006

(65) Prior Publication Data

US 2008/0163218 A1 Jul. 3, 2008

(51) Int. Cl.
*G06F 9/46* (2006.01)
(52) U.S. Cl. ........................................... 718/101
(58) Field of Classification Search ............... 718/101
See application file for complete search history.

(56) References Cited

U.S. PATENT DOCUMENTS

| | | | | |
|---|---|---|---|---|
| 5,778,390 A * | 7/1998 | Nelson et al. ........................... 1/1 |
| 6,662,203 B1 * | 12/2003 | Kling et al. .................... 718/103 |
| 7,054,827 B1 * | 5/2006 | Lautzenheiser et al. ......... 705/10 |
| 7,243,352 B2 * | 7/2007 | Mandava et al. ............... 718/104 |
| 2003/0055862 A1 * | 3/2003 | Bhat .............................. 709/101 |
| 2003/0093425 A1 * | 5/2003 | Shelton ............................ 707/10 |
| 2003/0135617 A1 * | 7/2003 | Larkin ........................... 709/225 |
| 2003/0204547 A1 * | 10/2003 | Davis et al. .................... 709/101 |
| 2004/0103413 A1 * | 5/2004 | Mandava et al. .............. 718/100 |
| 2004/0193637 A1 * | 9/2004 | Westendorf et al. ........... 707/102 |
| 2005/0071584 A1 * | 3/2005 | Griffin et al. .................. 711/162 |
| 2005/0149370 A1 * | 7/2005 | Brown .............................. 705/8 |
| 2005/0229184 A1 * | 10/2005 | Inoue et al. .................... 719/310 |
| 2005/0273474 A1 * | 12/2005 | Kawamura et al. ............ 707/200 |
| 2006/0059060 A1 | 3/2006 | Horn et al. |
| 2006/0184944 A1 * | 8/2006 | Schwerk ........................ 718/101 |
| 2006/0271568 A1 * | 11/2006 | Balkir et al. ................... 707/100 |
| 2007/0101331 A1 * | 5/2007 | Krebs ............................ 718/101 |
| 2007/0214161 A1 * | 9/2007 | Goyal et al. ................... 707/101 |
| 2007/0233581 A1 * | 10/2007 | Peter ............................... 705/27 |
| 2007/0234363 A1 * | 10/2007 | Ferrandiz ...................... 718/101 |
| 2008/0091712 A1 * | 4/2008 | Daherkar et al. .......... 707/103 R |
| 2008/0127186 A1 * | 5/2008 | Kanodia et al. ............... 718/101 |
| 2008/0161940 A1 * | 7/2008 | Gerwens et al. ................... 700/4 |
| 2009/0024997 A1 * | 1/2009 | Kobayashi .................... 718/101 |
| 2010/0146510 A1 * | 6/2010 | Teichmann et al. ........... 718/101 |

OTHER PUBLICATIONS

RFC in SAP Systems, [online] <http://help.sap.com/saghelp_erp2005vp/helpdata/en/22/042518488911d189490000e829fbbd/frameset.htm>, 13 pages, site visited Jul. 9, 2007.

* cited by examiner

*Primary Examiner* — Emerson Puente
*Assistant Examiner* — Hiren Patel
(74) *Attorney, Agent, or Firm* — Fish & Richardson P.C.

(57) ABSTRACT

Systems and processes may perform actions on a huge set of business objects, often in a batch process. A mass data run object may be instantiated based, at least in part, on a batch process request in a service-oriented architecture. Mass data run objects may include, potentially among other things, description elements and selection elements. The batch process can then be executed on a plurality of data elements using the mass data run object and its selection element.

19 Claims, 8 Drawing Sheets

CONFIGURATION AND EXECUTION OF MASS DATA RUN OBJECTS

TECHNICAL FIELD

The present invention relates to mass data processing and, more particularly, to batch process data processing utilizing mass data run objects.

BACKGROUND

Businesses commonly need to process large amounts of data. Work packages for the data processing are created from selections a user makes on a user interface. After the creation, work packages are usually executed sequentially by committing the transactions at the end of each work package. Currently, to process the data, reports are run that select data and provide the data to a user on a user interface. The reports often include a first part with parameters and selections for the data being processed and the mass data processing itself was implemented in the second part.

SUMMARY

Systems and processes may process large amounts of data. Systems and processes may include a user interface (UI) of a software application in a service-oriented architecture capable of performing various operations to data. UI may present options for the various operations available for batch processing of data using the software. To process large amounts of data (e.g., mass data processing) upon request from the software, a mass data run object (MDRO) may be used.

In one general aspect, a mass data run object may be instantiated based, at least in part, on a batch process request in a service-oriented architecture. The mass data run object includes a description element and a selection element. The batch process may be executed on a plurality of data elements using the mass data run object and the selection element of the mass data run object.

Implementations may include one or more of the following features. The batch process request and selection criteria for the selection element may be received via a user interface. The mass data object is executed synchronously or asynchronously. A work package may be generated for the batch process using the mass data run object and the work package may be transmitted to a framework for parallel processing. Executing the batch process may include retrieving at least one data element for a report based on the selection element, modifying at least one of the data elements based on the selection element, and/or archiving at least one of the data elements based on the selection element. The mass data run object may include a second selection element, where the first selection element is associated with the data elements operable to be archived and the second selection element is associated with particular selection criteria for data element types. Log objects associated with the particular mass data run object and the batch process may be instantiated. Log objects may include parameters for the batch process, a message, tracing information, and a summary, where at least one of the foregoing includes application-specific data. Log object may be saved by a remote process.

In another general aspect, systems may include means for instantiating a mass data run object based, at least in part, on a batch process request in a service-oriented architecture and means for executing the batch process on a plurality of data elements using the mass data run object and the selection element. The mass data run object includes a description element and a selection element.

Implementations may include one or more of the following features. The system may include means for receiving the batch process request and selection criteria for the selection element. The system may also include means for generating a work package for the batch process using the mass data run object and/or means for transmitting the work package to a framework for parallel processing. The system may include means for instantiating a log object associated with the particular mass data run object and the batch process.

Moreover, some or all of these aspects may be further included in respective systems or other devices for executing, implementing, or otherwise supporting a suitable software application. The details of these and other aspects and embodiments of the disclosure are set forth in the accompanying drawings and the description below. Other features, objects, and advantages of the various embodiments will be apparent from the description and drawings, as well as from the claims.

DETAILED DESCRIPTION

The present disclosure relates to methods, systems, and software for performing parallel processing on a set of business object actions forming a batch process. The batch process may be performed by compiling a group of independent work packages, each work package representing a discrete business object action. A work package may represent a set of instances of business objects manipulated by actions. The work packages are clustered and an individual session for each work package is created. The work packages are then executed in parallel by a framework for parallel processing ("FPP"), often external of (or otherwise logically decoupled from) a business application requesting the batch process. Each session is closed after processing of the work package is completed, and the cluster is closed after processing of the relevant work packages is completed. Systems and processes may process large amounts of data. To process large amounts of data (e.g., mass data processing), a Mass Data Run Object ("MDRO") may be used. Generally, the MDRO can be considered a specialized business object that is configured for a mass data processing task.

The techniques and components described herein may be implemented within an Enterprise Service Architecture (ESA) environment, often termed a Service Oriented Architecture (SOA). In certain implementations, SOA can be considered a blueprint for an adaptable, flexible, and open IT architecture for developing services-based, enterprise-scale business solutions. The respective enterprise service is typically a series of web services combined with business logic that can be accessed and used repeatedly to support a particular business process. Aggregating such web services into business-level enterprise services may provide a more meaningful foundation for the task of automating enterprise-scale business scenarios. The composite application framework comprises design tools, methodologies, services and processes, an abstraction layer for objects, and user interface and process pattern libraries. The composite application framework supports model-driven application composition, so a user may build applications with as little programming as possible, which often results in reduced development and deployment time for new/modified applications and business-pattern-oriented integration.

Figure 1:
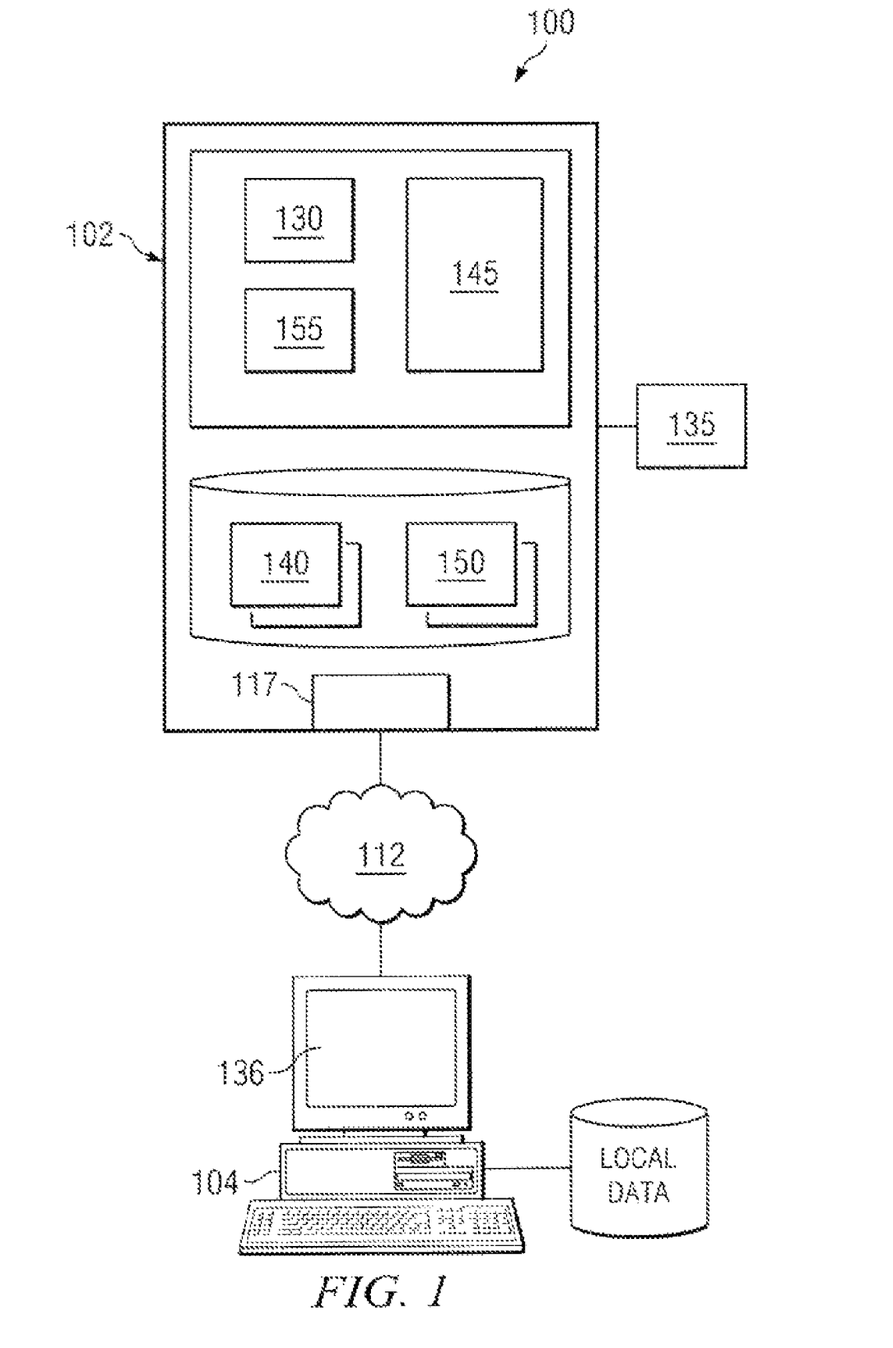
FIG. 1 illustrates an example system for parallel processing a plurality of independent work packages in accordance with one implementation of the present disclosure.

FIG. 1 illustrates an example business data processing system 100 that executes or otherwise implements batch processes that may alternatively or in combination utilize MDROs and the FPP for performing parallel processing of independent work packages. When appropriate, the system 100 may utilize the FPP to decrease an amount of time required to complete the particular batch process. The system 100 includes a server 102 for managing data services, such as business objects (often termed BOs) 140 and MDROs 150. The server 102 can typically be accessed in a stand-alone fashion (such as a website), within any suitable productivity tool (whether enterprise software, email application, and others) selected by the user or automatically interfaced, or in a cooperative fashion with a third party search engine. In other words, system 100 may manage and share a knowledge base of software assets or other data services (often using metadata) that can easily be integrated into different developer and end user tools.

System 100 is typically a distributed client/server system that spans one or more networks such as 112. In such cases, the various components—such as servers 102 and clients 104—may communicate via a virtual private network ("VPN"), Secure Shell ("SSH") tunnel, or other secure network connection. Accordingly, rather than being delivered as packaged software, system 100 may represent a hosted solution that may scale cost-effectively and help drive faster adoption. In this case, portions of the hosted solution may be developed by a first entity, while other components are developed by a second entity. In such embodiments, data may be communicated or stored in an encrypted format using any standard or proprietary encryption algorithm. This encrypted communication may be between the user (or application/client) and the host or amongst various components of the host. Put simply, communication or other transmission between any modules and/or components may include any encryption, export, translation or data massage, compression, and so forth as appropriate. Further, system 100 may store some data at a relatively central location (over a WAN) while concurrently maintaining local data at the user's site for redundancy and to allow processing during downtime. But system 100 may be in a dedicated enterprise environment—across a local area network (over LAN) or subnet—or any other suitable environment without departing from the scope of this disclosure.

Turning to the illustrated embodiment, system 100 includes or is communicably coupled (such as via a one-, bi- or multi-directional link or network) with server 102 and one or more clients 104, at least some of which communicate across network 1112. Server 102 comprises an electronic computing device operable to receive, transmit, process, and store data associated with system 100. Generally, FIG. 1 provides merely one example of computers that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer ("PC"), Macintosh, workstation, Unix-based computer, or any other suitable device. In other words, the present disclosure contemplates computers other than general purpose computers as well as computers without conventional operating systems. Server 102 may be adapted to execute any operating system, including Linux, UNIX, Windows Server, or any other suitable operating system. According to one embodiment, server 102 may also include or be communicably coupled with a web server and/or a mail server.

Illustrated server 102 includes the local memory 120 and may be coupled to the repository 135. Memory 120 and repository 135 may include any memory or database module and may take the form of volatile or non-volatile memory including, without limitation, magnetic media, optical media, random access memory ("RAM"), read-only memory ("ROM"), removable media, or any other suitable local or remote memory component. Illustrated memory 120 includes data services but may also include any other appropriate data such as VPN applications or services, firewall policies, a security or access log, print or other reporting files, HTML files or templates, data classes or object interfaces, child software applications or sub-systems, and others. Consequently, memory 120 and repository 135 may be considered a repository of data, such as a local data repository for one or more applications.

For example, memory 130 may include, point to, reference, or otherwise store a business object repository. In some embodiments, the business object repository may be stored in one or more tables in a relational database described in terms of SQL statements or scripts. In the same or other embodiments, the business object repository may also be formatted, stored, or defined as various data structures in text files, eXtensible Markup Language ("XML") documents, Virtual Storage Access Method ("VSAM") files, flat files, Btrieve files, comma-separated-value ("CSV") files, internal variables, or one or more libraries. In short, the business object repository may comprise one table or file or a plurality of tables or files stored on one computer or across a plurality of computers in any appropriate format. Indeed, some or all of the business object repository may be local or remote without departing from the scope of this disclosure and store any type of appropriate data. In particular embodiments, the business object repository may access the business objects in response to queries from clients 104.

These business objects may represent organized data relating to some project or endeavor, which may or may not be linked, with each object having one or more states related to the object. Each of the states, in turn, is associated with data that pertains to various modifiable parameters of the individual states of the object. One type of data modeling that includes multiple objects with each having multiple states, and each state having multiple instances of changes to the state's modifiable parameters is the business object model. Briefly, the overall structure of a business object model ensures the consistency of the interfaces that are derived from the business object model. The business object model defines the business-related concepts at a central location for a number of business transactions. In other words, it reflects the decisions made about modeling the business entities of the real world acting in business transactions across industries and business areas. The business object model is defined by the business objects 140 and their relationship to each other (the overall net structure).

Business object 140 is thus a capsule with an internal hierarchical structure, behavior offered by its operations, and integrity constraints. Business objects are generally semantically disjointed, i.e., the same business information is represented once. In some embodiments, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects 140 are generally arranged from the top to the bottom based on defined order of the business areas, e.g., finance could be arranged at the top of the business object model with CRM below finance and SRM below CRM. To ensure the consistency of interfaces, the business object model may be built using standardized data types as well as packages to group related elements together, and package templates and entity templates to specify the arrangement of packages and entities within the structure.

BO 140 is a representation of a business entity, such as an employee or a sales order. The BO 140 may encompass both functions (for example, in the form of methods) and data (such as one or more attributes) of the business entity. The implementation details of BO 140 are typically hidden from a non-development user, such as an end user, and the BO 140 may be accessed through defined functions. Accordingly, the BO may be considered encapsulated. BO may be used to reduce a system into smaller, disjunctive units. As a result, BOs improve a system's structure while reducing system complexity. BOs also form a point of entry of the data and functions of a system and enable the system to easily share data, communicate, or otherwise operate with other systems. According to one implementation, BO 140 may include multiple layers.

Figure 2:
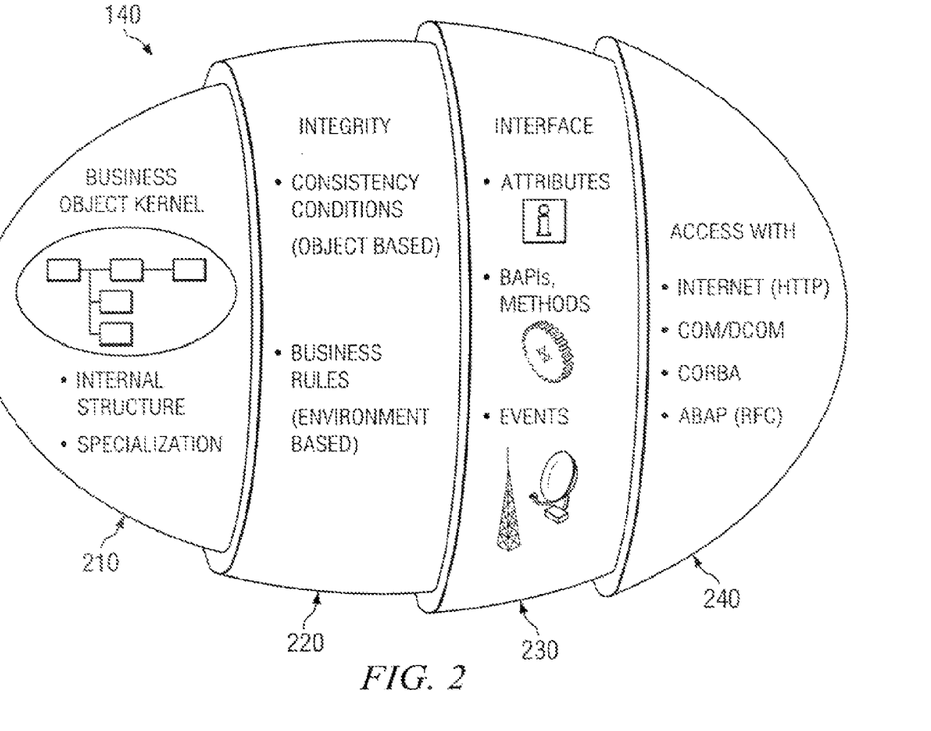
FIG. 2 is a graphical illustration of a business object and associated components.

FIG. 2 provides a graphical representation of a BO 140. As shown, an innermost layer or kernel 210 of the BO 140 may represent the BO's inherent data. Inherent data may include, for example, an employee's name, age, status, position, address, etc. A second layer 220 may be considered the BO's logic. Thus, the layer 220 includes the rules for consistently embedding the BO in a system environment as well as constraints defining values and domains applicable to the BO. For example, one such constraint may limit sale of an item only to a customer with whom a company has a business relationship. A third layer 230 includes validation options for accessing the BO. For example, the third layer 230 defines the BO's interface that may be interfaced by other BO's or applications. A fourth layer 240 is the access layer that defines technologies that may externally access the BO.

Accordingly, the third layer 230 separates the inherent data of the first layer 210 and the technologies used to access the inherent data. As a result of the described structure, the BO reveals only an interface that includes a set of clearly defined methods. Thus, applications may only access the BO via those defined methods. An application wanting access to the BO and the data associated therewith must include the information or data required to execute the clearly defined methods of the BO's interface. The clearly defined methods of the BO's interface represent the BO's behavior. That is, when the methods are executed, the methods may change the BO's data. Therefore, an application may utilize any BO by providing the required information or data without having any concern for the details related to the internal operation of the BO.

Other than BOs 140 and MDROs 150, system 100 may utilize various data services that can combine web services and data from multiple systems, in an application design made possible by a composite application framework. This framework typically includes the methodology, tools, and run-time environment to develop composite applications. It may provide a consistent object model and a rich user experience. Regardless of the particular type, category, or classification of the component, system 100 often stores metadata and other identifying information along with the actual piece of software (whether object or source). For example, the service may further include each component's definition, lifecycle history, dependents, dependencies, versions, use or "big name" cases, industry types or associations, role types, security profile, and usage information.

Returning to FIG. 1, server 102 also includes processor 125. Processor 125 executes instructions and manipulates data to perform the operations of server 102 such as, for example, a central processing unit ("CPU"), a blade, an application specific integrated circuit ("ASIC"), or a field-programmable gate array ("FPGA"). Although FIG. 1 illustrates a single processor 125 in server 102, multiple processors 125 may be used according to particular needs and reference to processor 125 is meant to include multiple processors 125 where applicable. In the illustrated embodiment, processor 125 executes or requests execution of at least development environment 130, business application 145, and FPP 155.

Within example development environment 130, an application can be developed (created or modified) using modeling systems. In general, these models can specify the types of development objects or components that can be used to build applications, as well as the relationships that can be used to connect those components. In a given modeled architecture, development objects can be organized by any combination of relationships, including hierarchical relationships, grouping relationships, and the like. In an object-oriented architecture, for example, a defined application can include a combination of various data objects and resources (i.e., development objects). In that example, relationships among the development objects can include a relationship indicating that one data object inherits characteristics from another data object. Another example architecture is the model-view-controller (MVC) architecture. Applications built using the MVC architecture typically include three different types of components—models, which store data such as application data; views, which display information from one or more models; and controllers, which can relate views to models, for example, by receiving events (e.g., events raised by user interaction with one or more views) and invoking corresponding changes in one or more models. When changes occur in a model, the model can update its views. Data binding can be used for data transport between a view and its associated model or controller. For example, a table view (or a table including cells that are organized in rows and columns) can be bound to a corresponding table in a model or controller. Such a binding indicates that the table is to serve as the data source for the table view and, consequently, that the table view is to display data from the table. Continuing with this example, the table view can be replaced by another view, such as a graph view. If the graph view is bound to the same table, the graph view can display the data from the table without requiring any changes to the model or controller. In the MVC architecture, development objects can include models, views, controllers, and components that make up the models, views, and controllers. For example, application data in a model can be an example of a component that is a development object.

According to some embodiments, the developer (or other analyst) may use the model-driven development environment 130 to create pattern-based or freestyle user interfaces using simple drag-and-drop services on the business objects 140 and MDROs 150. Because this development may be model-driven, the developer can typically compose an application using models of business objects 140 and MDROs 150 without having to write much, if any, code. In some cases, this example modeling environment may provide a personalized, secure interface that helps unify enterprise applications, information, and processes into a coherent, role-based portal experience. Further, the modeling environment may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment may provide a shared set of services for finding, organizing, and accessing unstructured content stored in third-party repositories and content management systems across various networks 112. Classification tools may automate the organization of information, while subject-matter experts and content managers can publish information to distinct user audiences. Regardless of the particular implementation or architecture, this modeling environment may allow the developer to easily model business objects 140 and MDROs 150 using this model-driven approach. As described in more example detail later, the model is deployed, environment 100 may translate the model into the required code for at least one application or web service. This deployed model may then be modified or enhanced as appropriate using the modeling environment 130, which is typically executed on one or more processors.

At a high level, business application 145 is any application, program, module, process, or other software that may execute, change, delete, generate, or otherwise requests or implements batch processes according to the present disclosure. In certain cases, system 100 may implement a composite application 145. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to server 102, one or more processes associated with application 145 may be stored, referenced, or executed remotely. For example, a portion of application 145 may be a web service that is remotely called, while another portion of application 145 may be an interface object bundled for processing at remote client 104. Moreover, application 145 may be a child or sub-module of another software module or enterprise application (not illustrated) without departing from the scope of this disclosure. Indeed, application 145 may be a hosted solution that allows multiple parties in different portions of the process to perform the respective processing. For example, client 104 may access application 145, once developed, on server 102 or even as a hosted application located over network 112 without departing from the scope of this disclosure. In another example, portions of software application 145 may be developed by the developer working directly at server 102, as well as remotely at client 104.

More specifically, business application 145 may be a composite application, or an application built on other applications, that includes an object access layer (OAL) and a service layer. In this example, application 145 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help composite application 145 to orchestrate a business process in synchronization with other existing processes (e.g., native processes of enterprise base systems) and leverage existing investments in the IT platform. Further, composite application 145 may run on a heterogeneous IT platform. In doing so, composite application 145 may be cross-functional in that it may drive business processes across different applications, technologies, and organizations. Accordingly, composite application 145 may drive end-to-end business processes across heterogeneous systems or sub-systems. Application 145 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes the composite application 145, it may instead be a standalone or (relatively) simple software program. Regardless, application 145 may also perform processing automatically, which may indicate that the appropriate processing is substantially performed by at least one component of system 100. It should be understood that this disclosure further contemplates any suitable administrator or other user interaction with application 145 or other components of system 100 without departing from its original scope. Finally, it will be understood that system 100 may utilize or be coupled with various instances of business applications 145. For example, client 104 may run a first business application 145 that is communicably coupled with a second business application 145. Each business application 145 may represent different solutions, versions, or modules available from one or a plurality of software providers or developed in-house. In some instances, multiple business application 145 may request batch process that can be run in parallel using the same FPP 155.

A batch job may be created and/or executed using MDRO 150 which may request parallel processing of the job (e.g., when the batch job contains tasks that are logically independent) using FPP 155. The FPP 155 executes the logically independent processing tasks in parallel with each other and coordinates post processing activities, such as recording the result of the processing and returning the results to the requesting application. In many cases, FPP 155 is logically decoupled from the business application 145, which can allow it to be easily updated and managed without normally requiring major updates to each application 145. Operation of the FPP 155 is described in more detail below.

Regardless of the particular implementation, "software" may include software, firmware, wired or programmed hardware, or any combination thereof as appropriate. Indeed, each of the foregoing software applications may be written or described in any appropriate computer language including C, C++, Java, Visual Basic, assembler, Perl, any suitable version of 4GL, as well as others. It will be understood that while these applications are shown as a single multi-tasked module that implements the various features and functionality through various objects, methods, or other processes, each may instead be a distributed application with multiple sub-modules. Further, while illustrated as internal to server 102, one or more processes associated with these applications may be stored, referenced, or executed remotely. Moreover, each of these software applications may be a child or sub-module of another software module or enterprise application (not illustrated) without departing from the scope of this disclosure.

Server 102 may also include interface 117 for communicating with other computer systems, such as clients 104, over network 112 in a client-server or other distributed environment. In certain embodiments, server 102 receives data from internal or external senders through interface 117 for storage in memory 120, for storage in DB 135, and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least portion of network 112 may facilitate communications between server 102 and at least one client 104. For example, server 102 may be communicably coupled to one or more "local" repositories through one sub-net while communicably coupled to a particular client 104 or "remote" repositories through another. In other words, network 112 encompasses any internal or external network, networks, sub-network, or combination thereof operable to facilitate communications between various computing components in system 100. Network 112 may communicate, for example, Internet Protocol ("IP") packets, Frame Relay frames, Asynchronous Transfer Mode ("ATM") cells, voice, video, data, and other suitable information between network addresses. Network 112 may include one or more local area networks ("LANs"), radio access networks ("RANs"), metropolitan area networks ("MANs"), wide area networks ("WANs"), all or a portion of the global computer network known as the Internet, and/or any other communication system or systems at one or more locations. In certain embodiments, network 112 may be a secure network associated with the enterprise and certain local or remote clients 104.

Client 104 is any computing device operable to connect or communicate with server 102 or network 112 using any communication link. For example, client 104 is intended to encompass a personal computer, touch screen terminal, workstation, network computer, kiosk, wireless data port, smart phone, personal data assistant ("PDA"), one or more processors within these or other devices, or any other suitable processing device. At a high level, each client 104 includes or executes at least GUI 136 and comprises an electronic computing device operable to receive, transmit, process, and store any appropriate data associated with system 100. It will be understood that there may be any number of clients 104 communicably coupled to server 102. Further, "client 104," "business," "business analyst," "end user," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. For example, client 104 may be a PDA operable to wirelessly connect with external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 136. Both the input device and output device may include fixed or removable storage media such as a magnetic computer disk, CD-ROM, or other suitable media to both receive input from and provide output to users of clients 104 through the display, namely the client portion of GUI or application interface 136.

GUI 136 comprises a graphical user interface operable to allow the user of client 104 to interface with at least a portion of system 100 for any suitable purpose, such as viewing application or other transaction data. Generally, GUI 136 provides the particular user with an efficient and user-friendly presentation of data provided by or communicated within system 100. For example, GUI 136 may present the user with the components and information that is relevant to their task, increase reuse of such components, and facilitate a sizable developer community around those components. GUI 136 may comprise a plurality of customizable frames or views having interactive fields, pull-down lists, and buttons operated by the user. For example, GUI 136 is operable to display certain data services in a user-friendly form based on the user context and the displayed data. In another example, GUI 136 is operable to display different levels and types of information involving data services based on the identified or supplied user role. GUI 136 may also present a plurality of portals or dashboards. For example, GUI 136 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by data services. It should be understood that the term graphical user interface may be used in the singular or in the plural to describe one or more graphical user interfaces and each of the displays of a particular graphical user interface. Indeed, reference to GUI 136 may indicate a reference to the front-end or a component of component manager 130, as well as the particular interface accessible via client 104, as appropriate, without departing from the scope of this disclosure. Therefore, GUI 136 contemplates any graphical user interface, such as a generic web browser or touchscreen, that processes information in system 100 and efficiently presents the results to the user. Server 102 can accept data from client 104 via the web browser (e.g., Microsoft Internet Explorer or Netscape Navigator) and return the appropriate HTML or XML responses to the browser using network 112.

Figure 3:
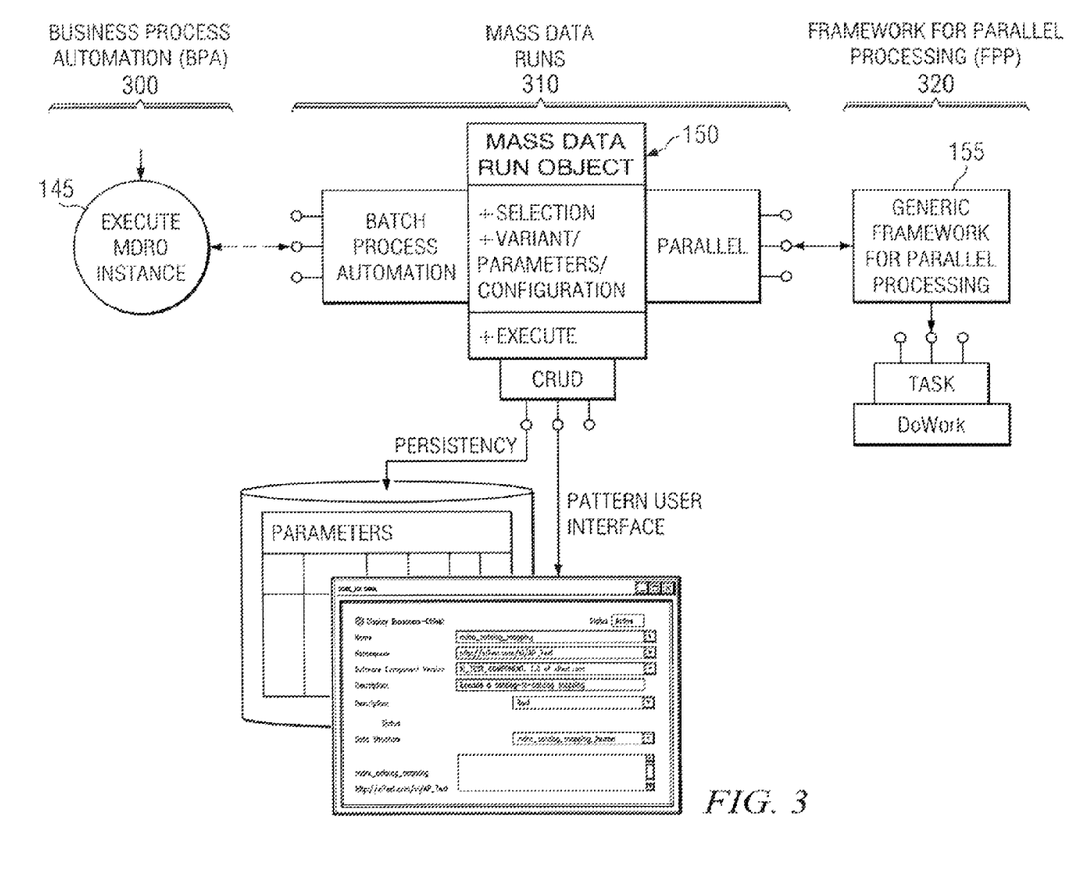
FIG. 3 illustrates the interrelation of various components utilized for parallel processing a plurality of work packages.

At a high level, FIG. 3 illustrates components for executing parallel processing, according to one implementation. There regions are illustrated. A first region is a Business Process Automation ("BPA") region 300; a second region is a Mass Data Run ("MDR") region 310; and a third region is an FPP region 320. An application, such as application 145, resides in the BPA region, while an MDRO and one or more BOs, such as the MDRO 150 and BO 140, reside in the MDR region. An FPP, such as FPP 155, resides in the FPP region. Although only one BO 140 is illustrated, any number of BOs may be included. The application 145 and the MDRO 150 are adapted to transfer data therebetween, and the MDRO 150 and FPP 155 are adapted to transfer data therebetween. Further, the FPP 155 and the BO 140 are adapted to transfer data therebetween.

Figure 4:
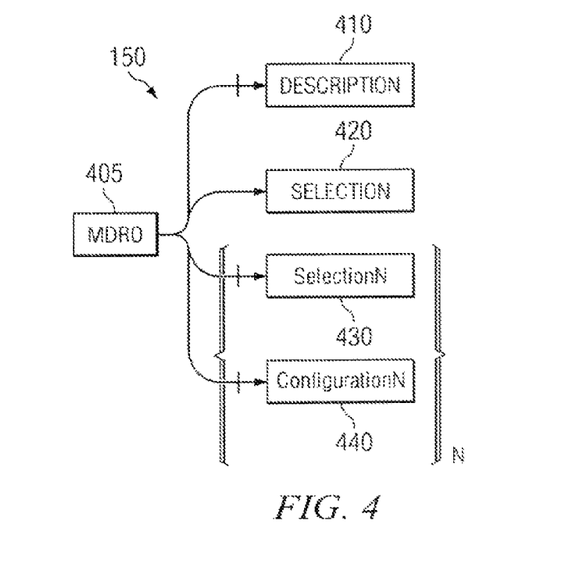
FIG. 4 illustrates an example mass data run object in accordance with certain embodiments of the present disclosure.

For batch process requests from business application in a service-oriented architecture (e.g., ESA or SOA), MDROs are used. MDRO nodes include a common structure to facilitate interaction with the framework (e.g., FPP), applications 145, and/or BOs 200. FIG. 4 illustrates an example MDRO 150. MDRO 150 includes a node root 405, a header or description element 410, and a selection element 420. MDRO may also include N additional nodes for the selection elements 430 and the configuration elements 440, as appropriate. Selection elements 420, 430 may include criteria used to retrieve data for the batch process. Configuration elements 440 may include parameters for executing MDRO 150. In some implementations, MDRO 150 may include one root node 405 and one description node 410 but multiple selection elements 430 and configuration elements 440.

Various nodes or elements of MDRO 150 may include actions or operations to be performed, parameters, selections, data, and/or other information to facilitate batch processing. Parameters define characteristics of the execution of MDRO. Selections include selection elements 430 that provide criteria by which data elements are retrieved for processing by the MDRO. The values for the parameters and selections may be stored remotely.

Root node 405 includes actions such as an EXECUTE action and QUERYBYHEADER query function. Root node 405 includes a general structure that allows certain executions to be selected from a list (e.g., drop-down menus, fields, etc.) on user interface (UI). Root node 405 allows scheduling of MDRO execution. As an example, root node 405 includes an EXECUTE action that is called to start the execution of the MDRO and PROCESS_ID EXECUTE action that may be executed for an instance of the MDRO.

Each MDRO node may produce multiple instances and each instance may be executed multiple times. For example, an instance of the MDRO may be "Material Requirement Planning," which is executed each night of a work day at a customer sites. Another example of an instance of the same MDRO may be executed on weekends. In some implementations, an MDRO may exist for each batch data processing request. In other implementations, a template with multiple MDROs may be used to produce MDROs for each batch data processing request.

Figure 5:
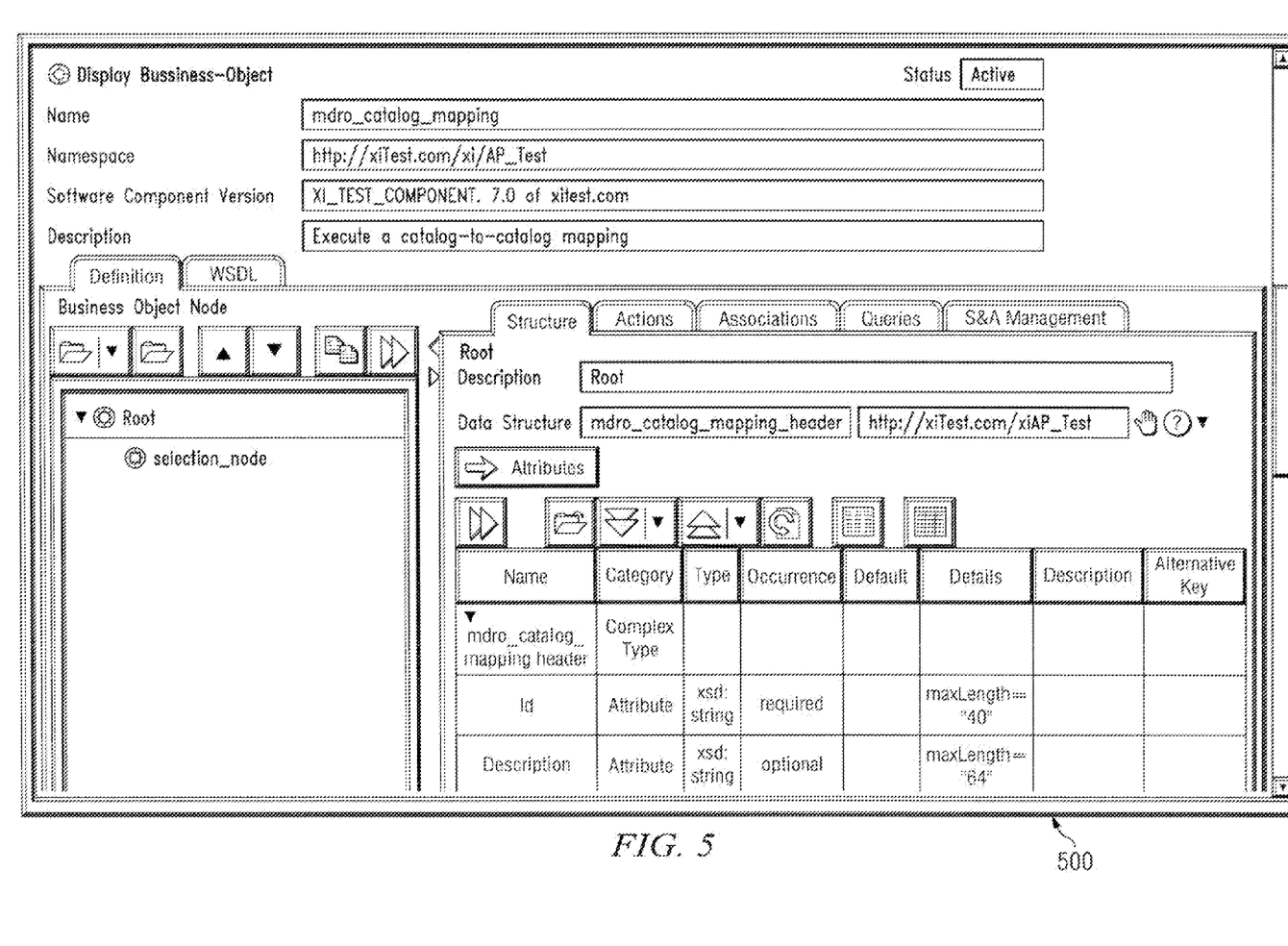
FIG. 5 illustrates a representation of an example work package in accordance with certain embodiments of the present disclosure.

FIG. 5 illustrates a representation of an example work package. Work packages are created when MDRO 150 is executed (e.g., by the EXECUTE action of the MDRO description element). The work packages are created from the selection of selection elements and parameters. For example, a user may select selection elements and parameters for MDRO via UI. The work package may be transmitted to the FPP. The FPP calls (e.g., by a local client proxy ("LCP")) an action of an arbitrary object that performs the necessary task to process the work package. An example for an action call via the FPP is listed below:

```
lo_cluster->execute_action( EXPORTING
  in_bo_name = someBusinessObject
  in_bo_node_name = headerNode
  in_action_name = processWorkPackage
  in_node_ids = node_ids
  in_parameter = action_parameter).
```

The FPP may then call the action via an LCP. The work package may be saved by the framework. The FPP actions may have the ability to retrieve and lock the required data (if it was not done before). Even if, as when using UI 500, those actions have been performed by the framework, the actions that are used to process work packages have to be LCP enabled. Although processing of MDRO is described in terms of the FPP, the MDRO may be processed using methods other than parallel processing (e.g., serial processing) or other parallel processing procedures.

Figure 6:
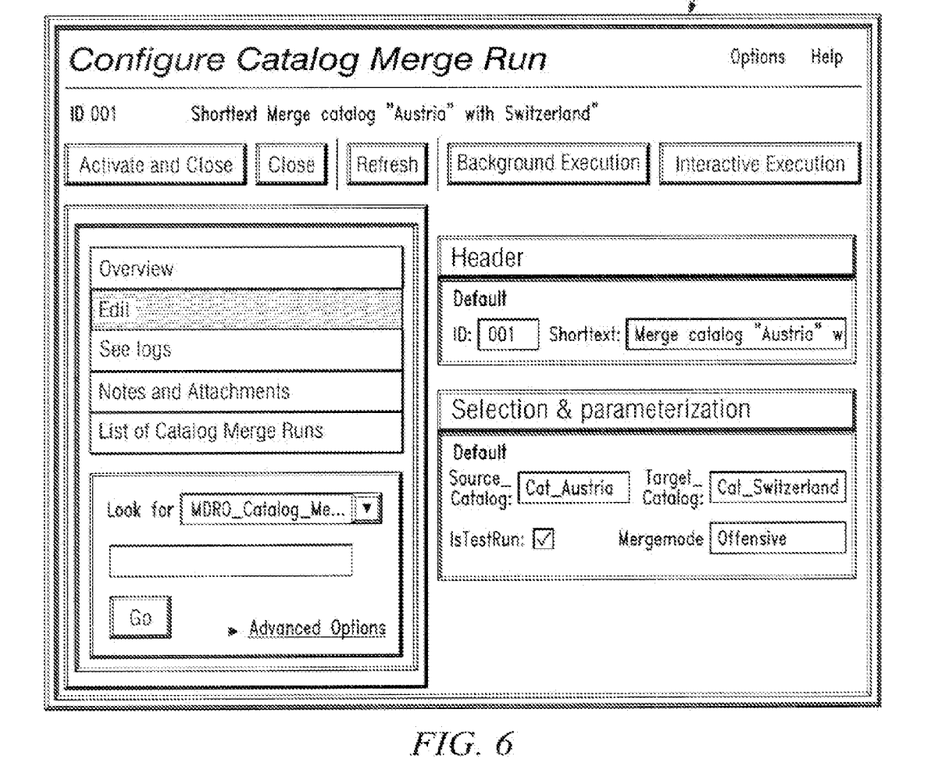
FIG. 6 illustrates another example user interface in accordance with certain embodiments of the present disclosure.

The UI may facilitate selection and viewing of the parameters and the selections for execution of MDRO. FIG. 6 illustrates an example of UI 600 for an instance of an MDRO 150. UI 600 includes portions for selection of the header or description element 410, selection elements 420, 430, and parameters for configuration elements 440.

UI 600 is a pattern UI (e.g., generic pattern UI) to maintain MDRO instances. MDRO instances may be executed multiple times directly from UI 600 or scheduled for a specified time period. Scheduling may be selected for description element 410 of MDRO 150 using UI 600.

UI 600 illustrates one instance of an MDRO titled "Catalog Merge Run". Each instance of the Catalog Merger MDRO may be executed multiple times. An instance of the MDRO may be instantiated for many executions of the MDRO instances and displayed on application screens of UI, rather than interactively created. If UI 600 illustrates MDRO to includes an "interactive creation indicator" that is true, the instance of MDRO was generated manually and if the interactive creation indicator is false, then the instance of the MDRO is generated by automatic functions. The interactive creation indicator may be a portion of the MDRO.

The maintenance of the different instances of the different MDRO nodes may be done via the application 145 or BO 140. Multiple instances for a certain MDRO may be maintained to reflect the different parameterizations/selections.

MDROs may be interactively executed synchronous or asynchronous. If an instance of a certain run is executed synchronously, the calling UI is blocked until the appropriate work packages are processed and finished. For example, an interactive task that needs to be processed in parallel to decrease the answer time of the system may be processed synchronously. Modifications in data in a synchronous execution may not be reflected automatically on the UI since the modifications are performed in different sessions. However, changes may be reflected by passing the change handlers of the work packages back to the UI by FPP functionality. Synchronous execution may be applied when the data that was modified or created by the run is not directly edited on the UI.

In other implementations, asynchronous execution is used. Asynchronous execution may be used when the user wants to start an execution of MDRO manually and/or when the user requests performance of other tasks during the execution of the MDRO. For example, MDROs may be asynchronously executed in a background environment of service-oriented architecture. Execution of MDROs may be manually commenced or scheduled. Long running MDROs may not be executed manually but scheduled for execution (e.g., at night, in a background, etc.). Scheduled executions may be periodic or a single scheduled execution.

Execution of MDRO 150 uses a selection element 420, 430 to retrieve the input data (e.g., the data on which batch processing is requested) on which the MDRO is executed. Selections may be selection elements 430 under the MDRO root node 405. For example, in the Catalog Merge Run MDRO illustrated in UI 600, a flat structured selection format is used for UI 600 and has attributes for the source catalog and for the target catalog. In some implementations, although a flat structured selection may be used to display small amounts of data, a tabular display may be used to allow selection of selection elements for large amounts of data processed. For example, a table may be used for display selections for an MDRO to be executed to run for material A* and MT* in one site and X* in another site.

The MDRO for an archiving execution may utilize a different form of UI for selection of selection elements. BO 140 that will be archived may be selected from a list of achievable BOs. Then, the selection parameters may be determined based at least partially on the selected business object (e.g., a material has different selections than a business partner) and displayed on the UI. User may enter selections for the selection elements of MDRO and the selections may be stored. For example, a table of the selections displayed on the UI may include with the structure "business object," "sign," "option," "low," and "high". A business object of this structure may be able to persist arbitrary selections.

Log objects may be instantiated for each type of MDRO. Log objects may be associated with a specific MDRO and batch process requested. For example, for each run an instance of the log is instantiated. Log objects may include business relevant information, such as parameters for the MDRO, error/messages, potentially tracing information, and/or a summary. The business relevant information may be application specific (e.g., related to the specific instance of the MDRO). Log objects may include structured information (e.g., "not just strings") such that for each instance task agent conditions can be defined upon log information. Log objects may include pointers to the related MDROs or jobs. Log objects may also be generic so that the application 145, BO 140, or the FPP 155 may access the log objects generically.

In some implementations, logs may be re-used for multiple MDROs. Instances of the log objects may be saved. For example, log objects may include instructions to save instances of the log object. The log instance may be the instance accessible for the duration of a execution of the MDRO.

Figure 7:
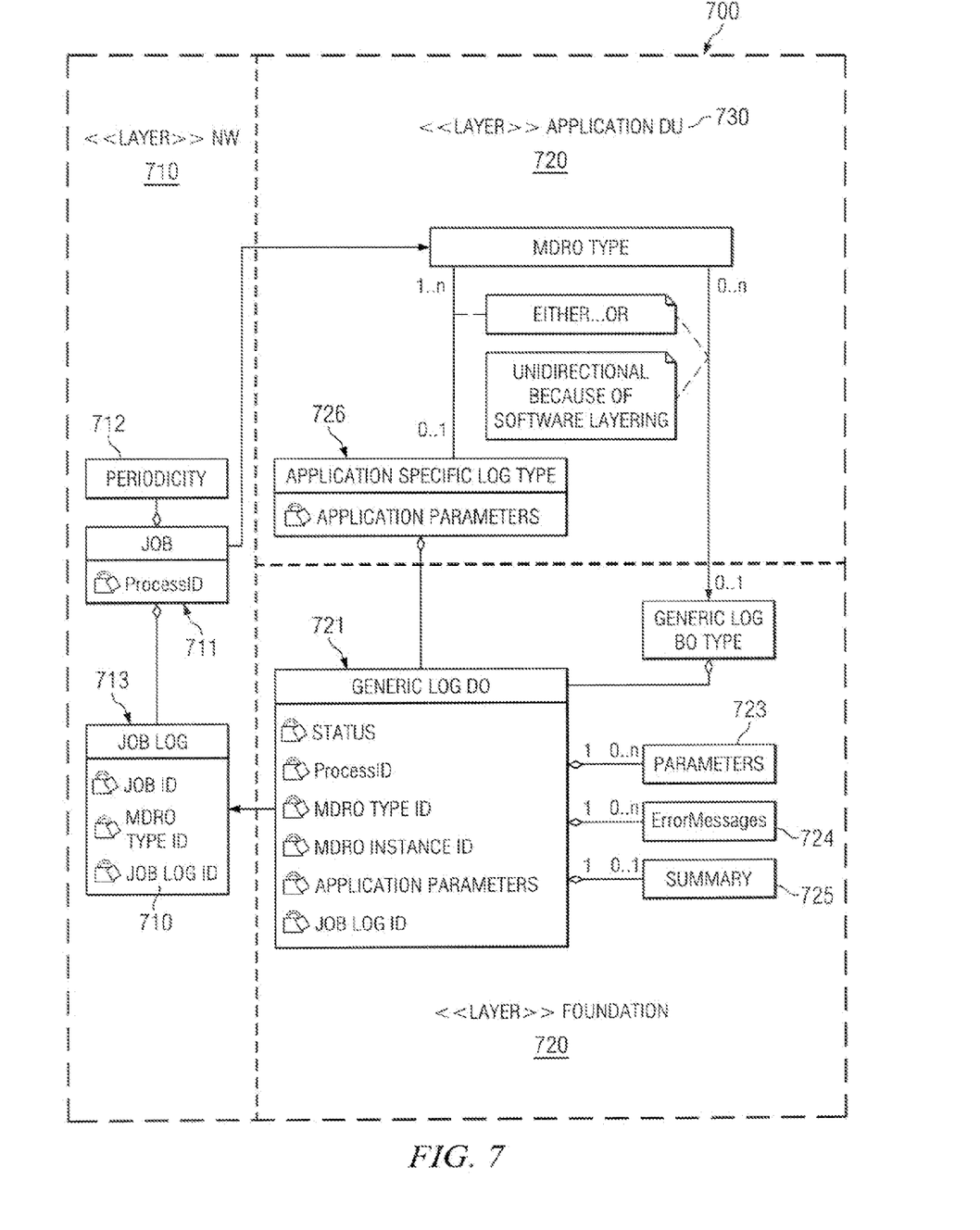
FIG. 7 illustrates an example class diagram for a log object in accordance with certain embodiments of the present disclosure.

FIG. 7 illustrates an example class diagram 700 for a log object. Log objects include job logs and logs associated with instances of MDROs. A job log may provide a job overview for the batch processes requested. Job logs may be viewed and various aspects may be modified. For example, the priority assigned to jobs may be modified and/or jobs may be rescheduled. Job scheduling in the job log may include a listing of application work centers containing the MDROs. Job overview may include application and system management.

Illustrated on a first portion 710, the scheduling component of the class diagram 700 of log object is a job object 711, a job periodicity object 712, and a job log 713. The job log 713 includes information regarding who scheduled an MDRO instance, when the MDRO instance was scheduled, when the MDRO instance was released, etc. Presentation of job log 713 may be restricted to users with authorization to deal with jobs.

A second portion 720 of the class diagram 700 of the log object includes a log associated with an MDRO instance. The log associated with an MDRO instance includes a generic part of the log object, illustrated as dependent object (DO) "Generic Log DO" 721. Generic Log DO 721 includes status, the process ID, MDRO type, MDRO instance ID, application parameters, and/or job log ID 722. Generic Log DO 721 also includes parameters of the run 723, messages 724 (e.g., error messages), and a summary 725. Generic Log DO 721 includes a pointer to the job log ID 722 so that the job log is accessible from the Generic Log DO. The association between the pointer to the job log ID 722 and the Generic Log DO 721 may be a unidireactional association so that a user with authorization for the job log does not see the application log ("Application DU") and the Generic Log DO. Messages may be persisted using concepts such as an AP Message Handling Concept.

Log objects may be instantiated for business objects referenced by an MDRO. Logs may be generic ("Generic Log BO") and include Generic Log DO or application specific ("Appl. Specific Log" 730) and include the Generic Log DO and application specific data 726.

In some implementations, each MDRO instance includes an instantiated log object. A log object may not be instantiated for each MDRO, in other implementations, and a generic log object 729 may be used. Log information may be stored in MDRO instances. A single UI may present information regarding the MDRO instance and the log object to a user.

Figure 8:
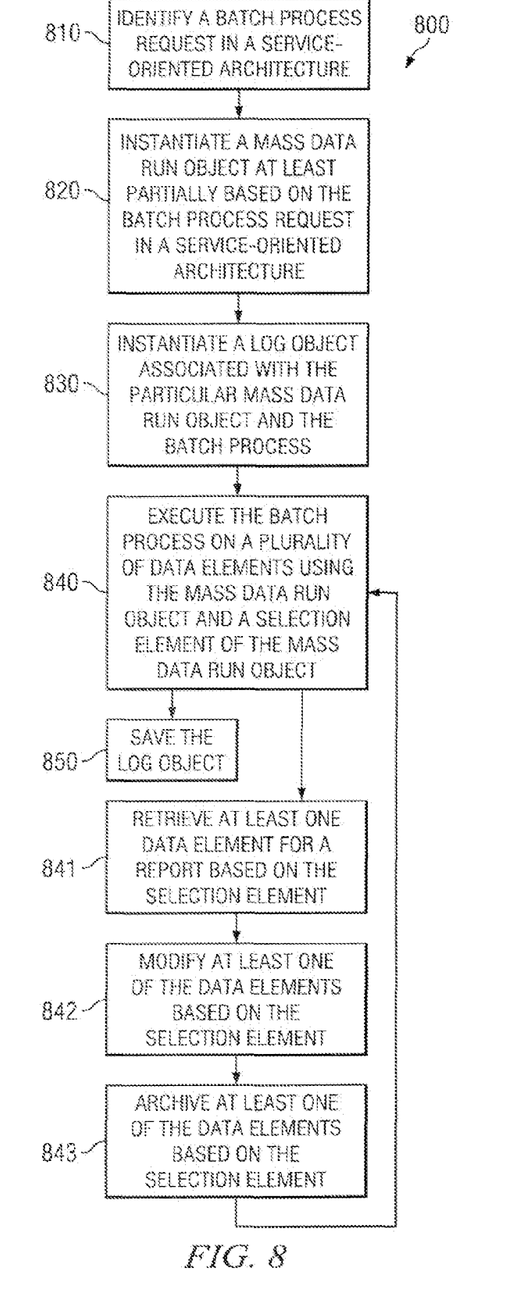
FIG. 8 illustrates an example process implementing certain techniques and components in accordance with one embodiment of the system in FIG. 1.

FIG. 8 illustrates an example process 800 for executing a batch process using MDRO 150. Regardless of the particular hardware or software architecture used, method 800 is generally capable of mass data processing, such as by request from BO 140 and/or based on selection of parameters and selection criteria by a user using UI 600. The following description of the flowchart illustrating method 800 focuses on the operation of the BO 140, or their components or sub-modules, in performing one of their respective methods or processes. But system 100 contemplates using any appropriate combination and arrangement of logical elements implementing some or all of the described functionality.

A request for a batch process request in a service-oriented architecture may be identified (operation 810). For example, a user may select selection elements and parameters for MDRO 150 using UI 600. A request for batch processing may be automatic when MDRO execution is scheduled to be performed periodically. MDRO may be instantiated at least partially based on the batch process request in a service-oriented architecture (operation 820).

A log object associated with the particular MDRO and batch process is instantiated (operation 830). For example, the log object may include parameters for the execution of the MDRO, messages, tracing information, summaries, and/or pointers to related MDROs. The information in the log object may be application-specific data (e.g., related to the particular MDRO and batch process). Log objects may facilitate compliance with record keeping standards and/or allow users to view and/or manipulate jobs.

The batch process may be executed on a plurality of data elements using MDRO and its respective selection elements (operation 840). This batch process may include any suitable data processing query including selection, modification, creation, and deletion (often term "CRUD" for create, read, update, and delete). For example, the illustrated method executes the batch process and retrieves at least one data element for a report based on the selection element (operation 841). For example, the selection element may indicate the criteria used to retrieve data to which batch processing has been requested. Executing the batch process also includes modifying at least one of the data elements based on the selection element (operation 842). For example, MDRO may perform operations on the retrieved data and alter the data. At least one of the data elements may be archived based on the selection element (operation 843). Although the execution of the batch process using the MDRO is described as including operations 841-843, execution of the batch process using the MDRO may include one or more of operations 841-843 and/or other operations. For example, a work package may be generated for the batch process using MDRO. MDRO 150 may be used to generate a work package for the batch process requested using UI 600. As another example, the work package may be transmitted to framework for parallel processing (FPP). The work package may be processed serially or via other parallel processing procedures. The log object may be saved (operation 850). For example, a remote process may save the log object.

The preceding flowchart and accompanying description illustrate exemplary method 800. System 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, system 100 may use methods with additional steps, fewer steps, and/or different steps, so long as the methods remain appropriate. For example, data may not be modified based on selection criteria and/or data may not be archived as part of the execution of a batch process using MDRO. As another example, the log object may not be saved. The MDRO may be executed synchronously.

An example of one MDRO from the financial perspective is illustrated below and is called "MDRO FINANCIAL." MDRO FINANCIAL, created during execution related to a closing process (perhaps via BO "AccountingAdjustmentRunTemplate"), may facilitate compliance with legal conditions, such as: availability of MDRO FINANCIAL for several years (e.g., Germany requires 10 years); electronic evaluation of MDRO FINANCIAL (e.g., no PDF or Spool); MDRO FINANCIAL available regardless releases of upgrades or system changes; inhibition of MDRO FINANCIAL modifications (to be guaranteed by retention medium, e.g., through check sums); and after passage of legal retention period MDRO FINANCIALS may be deleted automatically.

Further, MDRO FINANCIALS may have content requirement based on business requirements since a variety of business transaction executions are to be logged. Thus, the MDRO FINANCIAL is structured according to business logic where individual aspects for a business transaction are assigned to separate segments such as Common Segments (for general data that appear in every run) or Specific Segments (for data which are DU-specific/Business transaction specific). Examples of Common Segments that may appear in MDRO FINANCIALS include technical data; lists data related to program execution (e.g., Accountant, Start date, Start time, End date, End time, SAP Release, Number of processed packages, etc.); a note, where the note assigned to MDRO FINANCIAL stores information related to the corresponding business transaction (e.g., descriptive text, MS-Word-Document, PDF-Documents, etc.); a summary, where a summary stores and displays summarizing information of the corresponding business transaction (e.g., number of selected objects, number of error messages, number of warning messages, etc.); and/or messages that contain warning and error messages which appeared during the execution of MDRO.

MDRO FINANCIALS may include handling requirements for the data presented in the MDRO FINANCIAL. For example, data sets stored in the individual segments may have a relationship to each other (e.g., after a 'Foreign Currency Valuation Run,' an error message stored in common segment "Messages" relates to data in business transaction specific segment "Items Not Valuated."). Online navigation links may allow and facilitate navigation between the data. The MDRO FINANCIAL may be called from other display functions of applications 145 (e.g., balance sheet) in order to explain the displayed data. The calling function determines the granularity of MDRO FINANCIAL data to be displayed. The MDRO FINANCIAL may also offer functionality to call other display functions (e.g., document display).

MDRO FINANCIALS may additionally include authorization checks, so that presentation of MDRO FINANCIAL results are checked for assigned authorization, and validations. MDRO FINANCIAL content may be checked by customer-configured validation rules. For example, in a Foreign Currency Valuation Run the actual conversion rate is checked against limiting values. If a limit is exceeded, the posting will not be carried out and an error message will be included in the MDRO FINANCIAL.

The following process may be performed on the MDRO FINANCIAL. User may access a UI to select parameters and selection elements for MDRO FINANCIAL. The user, wanting to carry out a Foreign Currency Valuation, enters the corresponding Root Node ID of BO AccountingAdjustmentRun in order to trigger the corresponding EXECUTE Action for the Foreign Currency Valuation. Next, an EXECUTE action calls via ESF method 'FOREIGN_CURRENCY_VALUATION_RUN' of class ZCL_AAR_ROOT_EXECUTE, which gets the Business Partner Node IDs in BO ARP_Ledger to be evaluated by means of a QUERY. The QUERY gets a total 11 business partners. Then, 11 business partners are grouped into work packages of no more 5 business partners. Hence, three work packages are formed—two work packages of 5 business partners each and one work package containing only one business partner. 'FOREIGN_CURRENCY_VALUATION_RUN' calls the FPP transferring the work packages including the relevant interface data. In variable IN_PARAMETER the ROOT_NODE_ID of BO AccountingAdjustmentRun is transferred, so that BO ARP_Ledger knows where to instantiate MDRO FINANCIAL. MDRO FINANCIAL is created by BO ARP_Ledger on the MDRO FINANCIAL Node of BO AccountingAdjustmentRun).

FPP then calls via EXECUTE_ACTION the action 'VALUATE' of BO ARP_Ledger and transfers the work packages containing the business partners for processing. Class ZCL_ARP_VALUATE in BO ARP_Ledger carries out the foreign currency valuation for the business partners in each work package. After processing a work package, MDRO FINANCIAL summary is written onto MDRO FINANCIAL_ SUMMARY Node of BO AccountingAdjustmentRun. For example, MDRO FINANCIAL summary may list the number and type of processed business partners. Entries are created for the MDRO FINANCIAL summary in each work package.

After work packages have been processed, an overall summary of the processed data is created. The overall summary may include the number of listed processed business partners in the individual summary entries (e.g., 5+5+1=11 processed business partners).

In some implementations, business processes may be automated (e.g., BO 140, application 145, and so forth). Business Process Automation (BPA) may allow MDROs to be executed asynchronously and in the background of an environment. In BPA, processing of runs may be scheduled periodically (e.g., Day/Week/ . . . Period end processing, overnight runs). Long-running "jobs" may include "decoupled" processing with regards to dialog processing. Single job steps may be decoupled in the course of automated processing of job chains.

Asynchronous background processing is performed using reports that schedule the MDROs. BOs may create generic reports that are accessed by the MDROs. The generic report may differentiate between the different MDROs (types) and their instances. The differentiation between MDROs and their instances may be stored automatically (e.g., without a user input). Variants of MDRO (type+instance) may be identified rather than storing reports, in some implementations. A naming convention may be used in the generic report so that scheduling and monitoring can be done generically by identifying the MDRO instances without additionally identifying the specific instantiated MDRO.

Report selection screens may not be presented in the UI. MDRO instance maintenance may be provided via an application specific UI. A process ID may be transferred via an optional parameter in the EXECUTE action to the MDRO instance that allows modeled processes to "bundle" runs together (e.g., keep track off all errors in the runs). The process ID may be the same as the job (or job chain) ID.

MDRO execution may be initiated via a scheduled job in the generic scheduling UI or in an application UI. In generic scheduling, the entity to appear on the UI is the MDRO and its instances. Users may not be interested in technical entities like reports so MDRO instances may be "scheduled" on the UI although technically a report would be scheduled. Scheduling using an application UI may use enhanced XBP (external background processing) interface for the application. XBP may be ESI (enterprise service infrastructure) enabled to be called in a UI ESI session, which may include no forbidden statements and ESI transactional consistency. In some implementations, target servers may not be specified on application UIs and for administrator UIs. Load balancing and the FPP may perform this job. In addition, Advanced Business Application Programming ("ABAP") programs may be used to schedule MDRO execution. Load balancing may be possible in the NetWeaver infrastructure (SM50 . . . ). The FPP may use XBP Application Programming Interfaces ("APIs") to retrieve parameters that will influence resource consumption of the FPP (e.g., ProcessPriority).

MDROs may be executed immediately, as soon as the job is fully defined and a background work process is available, at an exact date and time, on a particular workday in a month, once another job finishes (there may be a UI to identify this job, e.g., providing job name, when it is scheduled, and the process component or DU it belongs to and filtering possibilities on either of these), once a system or user event occurs, once an operation mode switches, and others. In some implementations, an MDRO may be scheduled not to execute after a specified date and time (e.g., the job will not run if it is delayed beyond the specified date and time).

Job scheduling may be performed via application programmed scheduling or via the generic scheduling UI. The user maintaining MDRO instances may also be able to schedule MDROs. Job release and resource control may be performed by a local expert or key user having the local "Application Management Work Centre" or by the overall system administrator having the "ITSAM Work.Centre".

In some implementations MDRO execution may include a mass printing of invoices at night. Printing will be realized via output management. Print attributes may be accessed via a "Parameter Service" of an Output Management and a system-wide override for each usage. Printing may be realized by agent technology (e.g., specific print parameters might be set in the agent). The agent may be triggered during the MDRO execution and the usage is transparent to the execution. Another printing technique may be realized through direct call of Output Management APIs (e.g., specific print parameters might be set in the coding). A pointer to some spool entry may not be a result of an MDRO since printing is done asynchronously. Thus, the need to set print parameters may not exist on job level.

Communication may be provided to the framework when the job ends. After a job ends, a second report may be started via batch event. This may also keep CCMS and related tools "up-to-date." A dialog step may also occur (e.g., with a business task).

Figure 9:
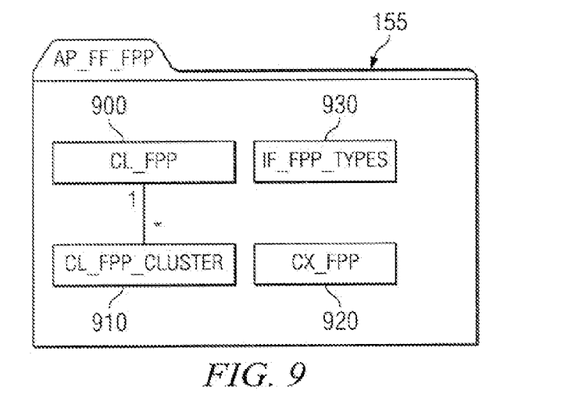
FIG. 9 is a graphical illustration of a framework for parallel processing.

FIG. 9 shows a graphical representation of FPP 155. The FPP 155 may include a CL_FPP component 900, which controls access to the FPP 155, such as by an MDRO. The FPP 155 may also include a CL_FPP_CLUSTER component 910 representing clustering concepts, i.e., the manner in which the work packages are arranged for parallel processing. CX_FPP 920 is an exception class that provides error handling. For example, the CX_FPP 920 passes each exception that occurs during processing of the clusters and work packages to the application. IF_FPP_TYPES 930 contain public types and constants used in the FPP method.

Figure 10:
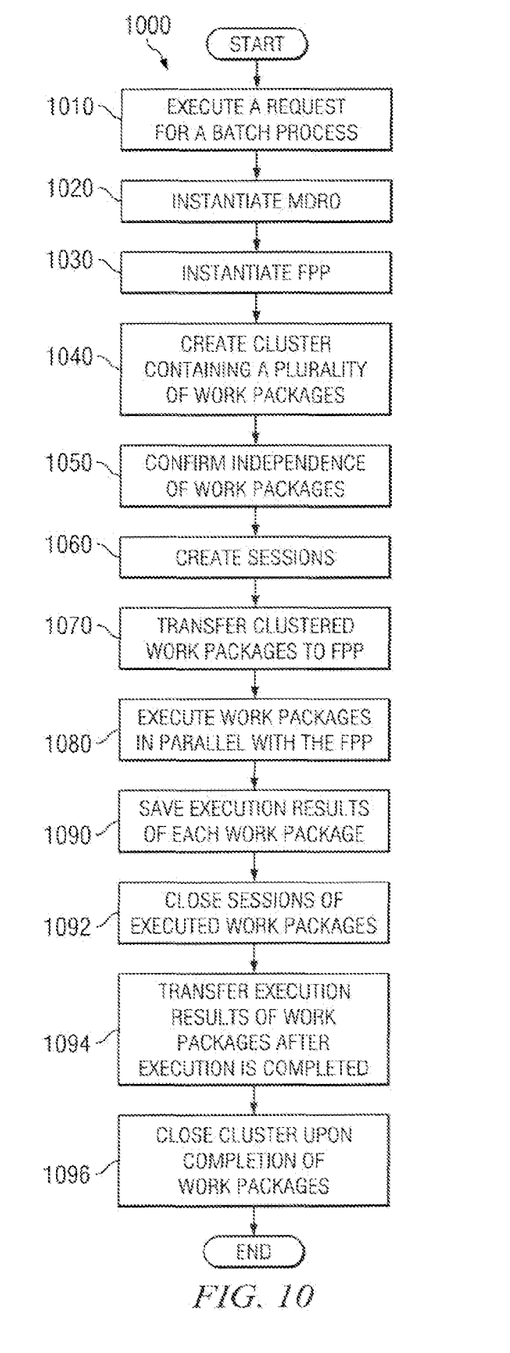
FIG. 10 is a method for parallel processing a plurality of independent work package according to one implementation.

FIG. 10 illustrates a method 1000 for utilizing an FPP to process independent data in parallel. At 1010, an application executes a request for a batch process. A batch process is a series of non-interactive jobs or tasks to be executed simultaneously, substantially simultaneously, or in a predetermined manner. The batch process includes a plurality of work packages. Each work package represents an independent task to be performed in a parallel session. Specifically, a work package is a logically independent entity which performs a single BO action. As a result of the batch job request, the application instantiates an MDRO at 1020. The MDRO is an object that is utilized to complete the batch process. Among other things, the MDRO retrieves the FPP that performs the batch processing at 1030 and opens a cluster at 1040. Several clusters may be opened in parallel. Utilizing several clusters of work packages may be necessary even through the work packages of the different clusters are logically independent. For example, different clusters may be needed when processing settings for one group of the independent work packages are different from the settings for a second group of the independent work packages. Further, the work packages of a first cluster may be processed and closed before the opening and processing of the work packages of a second cluster. Such order of operations ensures that the execution of the work packages of the first cluster are completed prior to the execution of the work packages of the second cluster.

The cluster acts as a virtual container for grouping a plurality of work packages to be processed together in parallel. At 1050, the MDRO may verify or otherwise confirm that the work packages are not interdependent. That is, the MDRO confirms that none of the clustered work packages have sequence dependencies with any of the other clustered work packages. In some cases, this confirmation may be performed by calling the execut_action_method as shown by at 1170 in FIG. 11. Thus, the clustered work packages may be executed together in parallel.

At 1060, a new session is created for each of the clustered work packages. For example, FPP creates the new session. According to one implementation, as many work sessions are created in parallel as resources may allow or are otherwise appropriate. That is, at any given time, resources may permit creation of a particular number of sessions in parallel. When no further resources are available, execution of the MDRO is temporarily halted so that no further work packages may be assigned to the cluster until resources are available. As resources become available, execution of the MDRO is continued and additional sessions for the remaining work packages are created. Thus, according to some implementations, the individual sessions for the work packages are created as the work packages are placed in the cluster. The tasks defined by the work packages are executed within the corresponding session.

At 1070, the cluster of work packages is transferred to FPP for parallel processing. The FPP then executes each of the BO action defined by the work packages. At 1080, the BO actions are executed in parallel, and the execution takes place in the individually assigned sessions. Example BO actions include creation, deletion, modification of BOs, as well as other types of actions. Further, each BO action included in the parallel processing may identify data required to complete the defined operation and configure the BO accordingly. Upon completion of each BO action, the results are saved at 1090. Saved information may include a save status (whether a save for a particular work package has been performed), change notifications (e.g., whether the BO action has resulted in a change to the inherent data of the BO), content change notification (e.g., the nature of any changes made to the BO as a result of the BO action), and any other desired information.

Once the BO action defined by a particular work package is complete and the results saved, the corresponding session is closed at 1092. At 1094, after each work package has been executed, the FPP communicates the results of the executed BO action to the MDRO. The results are subsequently forwarded to the application. Thus, according to some implementations, the results of the each executed work package are forwarded to the MDRO and the application once the work package has been executed. Additionally, the FPP may communicate the status of the BO actions. For example the FPP may indicate the status of a BO action implicitly by changing a status of the BO after being utilized in a particular session or explicitly by changing a status of the BO during execution of the BO action. Accordingly, BO action status may be forwarded by the FPP to the MDRO and/or the application during or after execution of the BO action.

At 1096, when the BO actions are completed and the associated sessions are closed, the cluster may also be closed. Prior to closing the cluster, the application confirms that no additional work packages remain to be executed. If additional work packages remain, the MDRO processing may be halted until the work packages remaining in the cluster have been completely processed. When no additional work packages remain, the cluster may be closed and, thereafter, the FPP instance may be terminated.

According to one implementation, once an instance of the FPP has been retrieved, another instance of the FPP may not be instantiated by a BO action being processed by the original FPP because, if nested FPP instances were otherwise allowed, the parallel processing may grow unmanageably large, potentially outstripping allocated resources.

Figure 11:
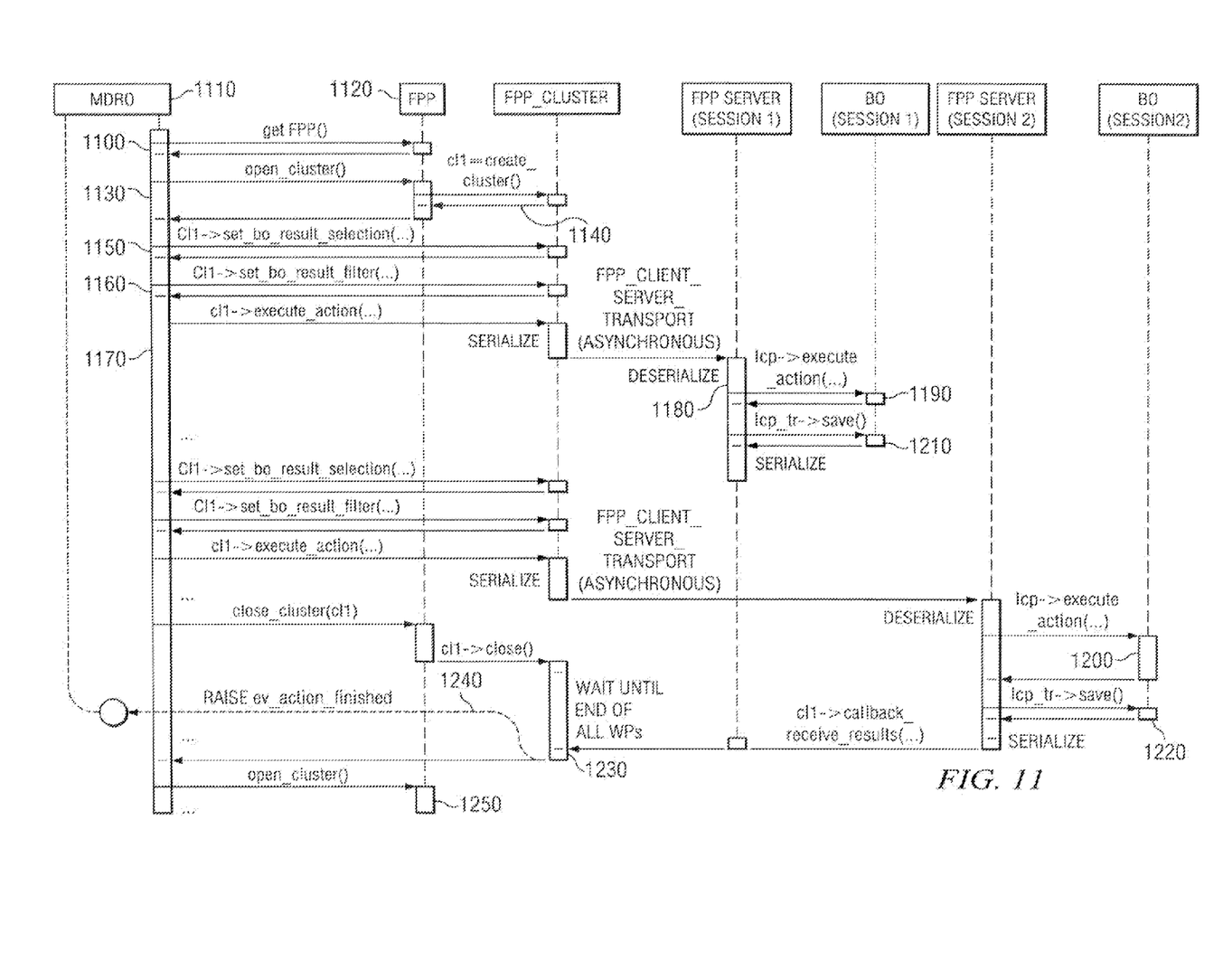
FIG. 11 is a graphical illustration of various process steps for performing parallel processing according to one implementation.

FIG. 11 shows a schematic illustration of parallel processing a cluster of work packages according to one implementation of the present disclosure. At 1100, the MDRO 1110 retrieves or instantiates an FPP 1120. At 1130, the MDRO 1110 sends an "open cluster" command to the FPP. In response, the FPP creates the cluster at 1140. At 1150, the MDRO 1110 defines the types of results to be returned upon execution of a BO action. At 1160, the MDRO 1110 defines a filter to be applied to the BO action results received. At 1170, the opened cluster is then populated with the BO actions defined by the independent work packages (not shown). A session for each work package may then be opened and a BO action defined by the work package included in the session. The BO actions may be transferred into the cluster in a serialized condition. Such serialization may include data serialization across persistencies or networks or so that the BO actions may be arranged in a particular order. At 1180, the BO action are deserialized, and the FPP 1120 executes the BO action sessions in parallel. 1190 indicates the execution of one of the BO actions contained in the cluster, while 1200 indicates another BO action being executed in parallel. At 1210 and 1220, results of the parallel processing of the BO actions are stored. At 1230, the results of the parallel processing are returned to the MDRO 1110. At 1240, the MDRO receives an indication that the parallel processing is complete, and the cluster is closed at 1250.

Although this disclosure has been described in terms of certain embodiments and generally associated methods, alterations and permutations of these embodiments and methods will be apparent to those skilled in the art. For example, certain embodiments of system 100 may be a standalone, but networked, client that retrieves local information, identifies the context of the local user, and provides presentation elements associated with remote objects, applications, or other data accessible via the network. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for mass data processing, the method comprising:

instantiating a mass data run object based, at least in part, on a batch process request in a service-oriented architecture, the mass data run object comprising a description element, a first selection element, a second selection element, and an execute action, wherein the execute action comprises code for execution of the mass data run object, the first selection element is associated with the data elements operable to be archived and includes criteria used to retrieve data for a batch process performed in response to the batch process request, and the second selection element is associated with particular selection criteria for data element types;

performing, by the mass data run object when executed, the execute action to generate a plurality of work packages for the batch process based on the first selection element and the second selection element, each work package comprising a discrete business object action;

creating multiple clusters with each cluster having a different group of independent work packages from the plurality of work packages;

for each cluster, confirming that none of the work packages in the cluster have sequence dependencies with any other work packages in the cluster; and executing the batch process on a plurality of data elements by transmitting each cluster to a framework for parallel processing, wherein the framework is configured to execute each of the discrete business object actions of the work packages in each cluster in parallel.

2. The method of claim 1, further comprising receiving the batch process request and selection criteria for the first and the second selection element via a user interface.

3. The method of claim 1, wherein the mass data run object is executed synchronously.

4. The method of claim 1, wherein the mass data run object is executed asynchronously.

5. The method of claim 1, wherein executing the batch process includes transmitting the work package to a logically decoupled framework for parallel processing.

6. The method of claim 5, wherein the framework for parallel processing calls an action using a local client proxy to retrieve and lock required data for processing the work package.

7. The method of claim 1, wherein executing the batch process includes retrieving at least one data element for a report using the first and the second selection element.

8. The method of claim 1, wherein executing the batch process includes at least one of modifying or archiving at least one of the data elements based on the first and the second selection element.

9. The method of claim 1 further comprising instantiating a log object associated with the particular mass data run object and the batch process.

10. The method of claim 9, wherein the log object includes parameters for the batch process, a message, tracing information, and a summary, at least one of the foregoing comprising application-specific data.

11. The method of claim 9, the log object operable to be saved by a remote process.

12. The method of claim 1, wherein different instances of the mass data run object are used for different batch process requests.

13. Software for mass data processing, the software comprising computer readable instructions embodied on non-transitory, tangible, computer-readable media and operable to:
    instantiate a mass data run object based, at least in part, on a batch process request in a service-oriented architecture, the mass data run object comprising a description element, a first selection element, a second selection element, and an execute action, wherein the execute action comprises code for execution of the mass data run object, and wherein the first selection element is associated with the data elements operable to be archived and includes criteria used to retrieve data for a batch process performed in response to the batch process request, and the second selection element is associated with particular selection criteria for data element types;
    perform, by the mass data run object when executed, the execute action to generate a plurality of work packages for the batch process based on the first selection element and the second selection element, each work package comprising a discrete business object action;
    create multiple clusters with each cluster having a different group of independent work packages from the plurality of work packages;
    for each cluster, confirm that none of the work packages in the cluster have sequence dependencies with any other work packages in the cluster; and
    execute the batch process on a plurality of data elements by transmitting each cluster to a framework for parallel processing, wherein the framework is configured to execute each of the discrete business object actions of the work packages in each cluster in parallel.

14. The software of claim 13, further operable to receive the batch process request and selection criteria for the first and the second selection element via a user interface.

15. The software of claim 13, wherein executing the batch process includes transmitting the work package to a logically decoupled framework for parallel processing.

16. A system for mass data processing, the system comprising:
    memory for storing one or more mass data run objects; and
    one or more processors operable to:
        instantiate a mass data run object based, at least in part, on a batch process request in a service-oriented architecture, the mass data run object comprising a description element, a first selection element, a second selection element, and an execute action, wherein the execute action comprises code for execution of the mass data run object, and wherein the first selection element is associated with the data elements operable to be archived and includes criteria used to retrieve data for a batch process performed in response to the batch process request, and the second selection element is associated with particular selection criteria for data element types;
        perform, by the mass data run object when executed, the execute action to generate a plurality of work packages for the batch process based on the first selection element and the second selection element, each work package comprising a discrete business object action;
        create multiple clusters with each cluster having a different group of independent work packages from the plurality of work packages;
        for each cluster, confirm that none of the work packages in the cluster have sequence dependencies with any other work packages in the cluster; and
        execute the batch process on a plurality of data elements by transmitting each cluster to a framework for parallel processing, wherein the framework is configured to execute each of the discrete business object actions of the work packages in each cluster in parallel.

17. The system of claim 16, wherein the batch process request and selection criteria for the first and the second selection element are received via a user interface.

18. The system of claim 16, wherein executing the batch process includes transmitting the work package to a logically decoupled framework for parallel processing.

19. The system of claim 16, wherein the one or more processors are further operable to instantiate a log object associated with the particular mass data run object and the batch process.

* * * * *